(12) United States Patent
Ruff (10) Patent No.: US 6,230,078 B1
(45) Date of Patent: *May 8, 2001

(54) SIMPLIFIED ANIMATRONIC AND CNC SYSTEM

(76) Inventor: John D. Ruff, 206 Birch St., Alexandria, VA (US) 22305

( * ) Notice: Subject to any disclaimer, the term of this patent is extended or adjusted under 35 U.S.C. 154(b) by 0 days.

This patent is subject to a terminal disclaimer.

(21) Appl. No.: 09/118,889

(22) Filed: Jul. 20, 1998

Related U.S. Application Data

(63) Continuation-in-part of application No. 08/588,473, filed on Jan. 18, 1996, now Pat. No. 5,784,541.

(51) Int. Cl.[7] ............................. G05B 19/04; G06F 13/12
(52) U.S. Cl. .............................................. 700/247; 710/63
(58) Field of Search ........................... 700/247; 707/522; 710/63

(56) References Cited

U.S. PATENT DOCUMENTS

| 4,454,576 | * | 6/1984 | McInroy | 707/522 |
| 5,202,963 | * | 4/1993 | Zelley | 710/63 |
| 5,784,541 | * | 7/1998 | Ruff | 700/247 |

* cited by examiner

*Primary Examiner*—William Grant
*Assistant Examiner*—Ronald D Hartman, Jr.

(57) ABSTRACT

A simplified system using a computer to control the speed and direction of multiple stepper motors, so that a script for a sequence of operations of the motors can be prepared and edited, using ASCII characters, on the computer monitor. This script is then stored on disc, and can be played back through the parallel port to control the motors to perform the sequence of operations. Each letter of the alphabet can identify a different motor speed, and each line of the script contains one letter for each motor being controlled. On commencing play back, the first line is scanned and the required motor speeds set and activated. After about 1/20 of a second the next line is similarly scanned and the motor speeds are again adjusted to the current script requirements. Playback then proceeds in the same manner line by line through the script. The system can also be applied to CNC (computer numerical control) of machine tools and production processes. A synchronized digital control system gives excellent positional control of motorized elements. The system includes fine and coarse feed rates in CNC operation by means of two motors selectively controlling the same axis, coupled by a differential gearing drive.

1 Claim, 6 Drawing Sheets

| BIT NUMBERS | | | | | | | | 0 0 0 | 0 0 1 | 0 1 0 | 0 1 1 | 1 0 0 | 1 0 1 | 1 1 0 | 1 1 1 |
|---|---|---|---|---|---|---|---|---|---|---|---|---|---|---|---|
| b7 | b6 | b5 | b4 | b3 | b2 | b1 | COLUMN / ROW | 0 | 1 | 2 | 3 | 4 | 5 | 6 | 7 |
| | | | 0 | 0 | 0 | 0 | 0 | NUL | DLE | SP | 0 | @ | P | ` | p |
| | | | 0 | 0 | 0 | 1 | 1 | SOH | DC1 | ! | 1 | A | Q | a | q |
| | | | 0 | 0 | 1 | 0 | 2 | STX | DC2 | " | 2 | B | R | b | r |
| | | | 0 | 0 | 1 | 1 | 3 | ETX | DC3 | # | 3 | C | S | c | s |
| | | | 0 | 1 | 0 | 0 | 4 | EOT | DC4 | $ | 4 | D | T | d | t |
| | | | 0 | 1 | 0 | 1 | 5 | ENQ | NAK | % | 5 | E | U | e | u |
| | | | 0 | 1 | 1 | 0 | 6 | ACK | SYN | & | 6 | F | V | f | v |
| | | | 0 | 1 | 1 | 1 | 7 | BEL | ETB | ' | 7 | G | W | g | w |
| | | | 1 | 0 | 0 | 0 | 8 | BS | CAN | ( | 8 | H | X | h | x |
| | | | 1 | 0 | 0 | 1 | 9 | HT | EM | ) | 9 | I | Y | i | y |
| | | | 1 | 0 | 1 | 0 | 10 | LF | SUB | * | : | J | Z | j | z |
| | | | 1 | 0 | 1 | 1 | 11 | VT | ESC | + | ; | K | [ | k | { |
| | | | 1 | 1 | 0 | 0 | 12 | FF | FS | , | < | L | \ | l | \| |
| | | | 1 | 1 | 0 | 1 | 13 | CR | GS | - | = | M | ] | m | } |
| | | | 1 | 1 | 1 | 0 | 14 | SO | RS | . | > | N | ^ | n | ~ |
| | | | 1 | 1 | 1 | 1 | 15 | SI | US | / | ? | O | _ | o | DEL |

SIMPLIFIED ANIMATRONIC AND CNC SYSTEM

CROSS-REFERENCE TO A RELATED APPLICATION

This application is a continuation-in-part of my U.S. patent application Ser. No. 08/588,473 filed Jan. 18, 1996, which issed on Jul. 21, 1998 as U.S. Pat. No. 5,784,541.

The subject matter of this aforesaid application is expressly incorporated herein in its entirety.

BACKGROUND OF THE INVENTION

The present invention pertains to pre-programmed computer (PC) control of controllable devices having variable settings. In one example, the present invention may be applied to mechanical animation of imitation human or animal figures and can be used in advertising, window displays, trade shows, amusement parks & movie making, providing lifelike movements of limbs and other parts of these figures. The motive force for these movements can be from electric motors, or from hydraulic (or pneumatic) actuators controlled by solenoid valves activated by the control system. A separate reversible motor or actuator (channel of control) can be used for each part of the figure being animated. A script defining the real time movements of each motor is scanned within the PC and data is sent to the motors to control their speeds and directions of rotation.

In another example the present invention may be applied to Computer Numerical Control (CNC) of machine tools and manufacturing processes. By this method, cutting tools, machine elements and materials are moved by stepper motor drives to pre-planned positions according to a prepared file in the PC. Currently, most existing higher quality animation and CNC systems employ closed loop servo-systems. These systems have accurate control of positioning by encoder feedback. However these systems are somewhat complex and since a multi-axis CNC system with associated workell control may need thirty or more axes of movement, cost is a very big factor.

In my prior U.S. Pat. No. 5,784,541 I dislose a method and apparatus for controlling the speed of stepper motors according to the varying frequencies of pulses produced by a stable multi-vibrators. The frequency of the scanning of the script within the PC is also controlled by pulses produced by an a stable multi-vibrator. However pulse frequencies produced in this manner are not very accurate. This inaccuracy causes a less than perfect coordination between motor control pulse frequency and scan frequency. As a result, during the time span of any single scan, it can not be certain that an exact number of complete motor control pulses will be produced. This may result in some incomplete step cycles of the stepper motors, and thus some positioning inaccuracy. In most animation applications this does not present a problem since these slight inaccuracies are not noticeable, and since methods for making corrections for inaccurate positioning are also disclosed in that pending application. But in CNC operation these inaccuracies cannot be tolerated. Additionally in some animation applications it would be an improvement to avoid these inaccuracies and the need to make corrections for them.

In the present invention I disclose a method and apparatus for using frequency dividers that divide one master clock frequency into multiple various frequencies. These frequencies are used for producing: (a) various pulse frequencies to control the speed of stepper motors at different speeds, and (b) a pulse frequency to control the scanning of the script in the PC. This arrangement produces motor speed control pulses that can be synchronized with the frequency of the scanning of the script in the PC. With this arrangement an exact number of complete motor speed control pulses can be assured during the time span of each scan, regardless of motor speed. This eliminates positioning inaccuracies and produces a system ideal for CNC and higher quality animation applications.

Additionally in the present invention I disclose a method and apparatus for selectively using either of two stepper motors, each with a different drive gear ratio, to drive a single axis output, by the use of a two input, single output differential gear system. In CNC operation this enables a high resolution feed drive with one motor activated, or a high speed rapid positioning drive with the other motor activated.

The objective of the present invention is to provide an improved system for PC control of multiple controllable devices (e.g. speed and direction of animation or CNC motors) in accurately controlled repeatable performances (or operations), which is simpler to operate and less expensive than currently available systems.

SUMMARY OF THE INVENTION

The simplified system, as applied to electric stepper motors for mechanical animation of figures and machine CNC (which are examples of only two of its many applications) uses open loop control, controlling the speed of each motor by varying the frequency of pulses sent to it. The pulse frequency sent to a given motor can be increased in progressive steps, causing higher motor speeds, or it can be decreased, causing the motor to run at lower speeds. In a typical embodiment of the present invention, eight steps of variation can be specified in the writing phase, (and reproduced in the playback phase) by letters of the alphabet using the ASCII code. Forward movement is prescribed by choosing upper case letters, and reverse movement (at the same speeds) is prescribed by the same letters in lower case. A line of the script (as displayed on the monitor) contains a letter of the alphabet for each of the (typical number of) thirty motors being controlled. The priority of the letter determines the speed of that particular motor at that part of the script. For example: a letter "A" typically specifies the fastest speed in a clockwise rotation, while a letter "H" typically specifies the slowest speed, with the symbol "@" specifying a dead stop. The letters "a" and "h" (in lower case) then specify the fastest and slowest speeds in an anti-clockwise rotation. On each of the subsequent lines of script there is always the same number of letters, and the letters for the various motors are always presented in the same order, so that the letters for a given motor are present in a vertical column. This arrangement makes it easy to see what each motor is to be doing at a given time, and to compare it with other motor movements at that same time. This is important in animation applications since coordination of the movements of different parts of a figure is usually necessary. It can be seen that setting the speed of a motor at a specific time is very easy, usually requiring only one keystroke.

When the script has been prepared it is saved to disc and the contained data then outputted through the PC parallel port to control the motors. In the process of outputting the data, each character in each line of script is scanned consecutively at a scan rate controlled by a constant frequency pulse source. The outputted data corresponding to each character is distributed to the appropriate motors, causing each motor to run at the prescribed speed until the scan of the next line of script, when the speed may be changed (or not changed), as prescribed by the script. For precise positioning, the present invention uses synchronized pulse sources, in which the scan frequency, and all he motor speed pulse frequencies are obtained by frequency dividers that divide into a master clock frequency. In this way it is possible to ensure that during the time span of each scan an exact number of complete motor speed pulses are produced, at any given motor speed.

The present invention can have applications with CNC systems, using position sensors to control positioning at machine zero & critical work-piece mensions, and providing an overall simpler, less expensive system. Because our ample multiple axis capability a machine tool can be included in a work-cell with synchronized multi-operational handling of work-pieces before machining operation; all included in the same control system. This might include sorting, conveying, positioning, clamping & chucking of parts before machining or other processing operations. Also, unclamping, conveying, assembly & packaging after processing. Since the CNC application of the current invention uses synchronized pulse sources, and the motor pulse frequencies are divided and maintained outside the PC, there is no likelihood of computer interrupt delays that might corrupt the integrity of the motor pulse train and cause positioning inaccuracies. For this reason CNC stepper motors can be used without encoder feedback. This is a very clean system because at any moment only one data byte is being outputted from the PC, as part of a regularly (time) spaced stream of control data. Likewise, on the receiving end, the circuitry of each motor is isolated from all other devices.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several FIGS. are identify by the same reference numerals, and wherein.

DESCRIPTION OF THE PREFERRED EMBODIMENTS

In order to facilitate reference to the disclosure material incorporated herein from my U.S. Pat. No. 5,748,541 reference numerals up to and including 110 appearing in the accompanying drawings are chosen to correspond to those reference numerals employed in the aforesaid patent application for like elements. Higher reference numerals appearing in the accompanying drawings designate elements not present in the aforesaid patent applications. In the interest of brevity, and to facilitate understanding of the subject matter of the present invention, the following description omits some of the detailed descriptions and discussions of portions of the system that were described and discussed in full detail in the aforesaid patent application.

Figures 1, 1A:
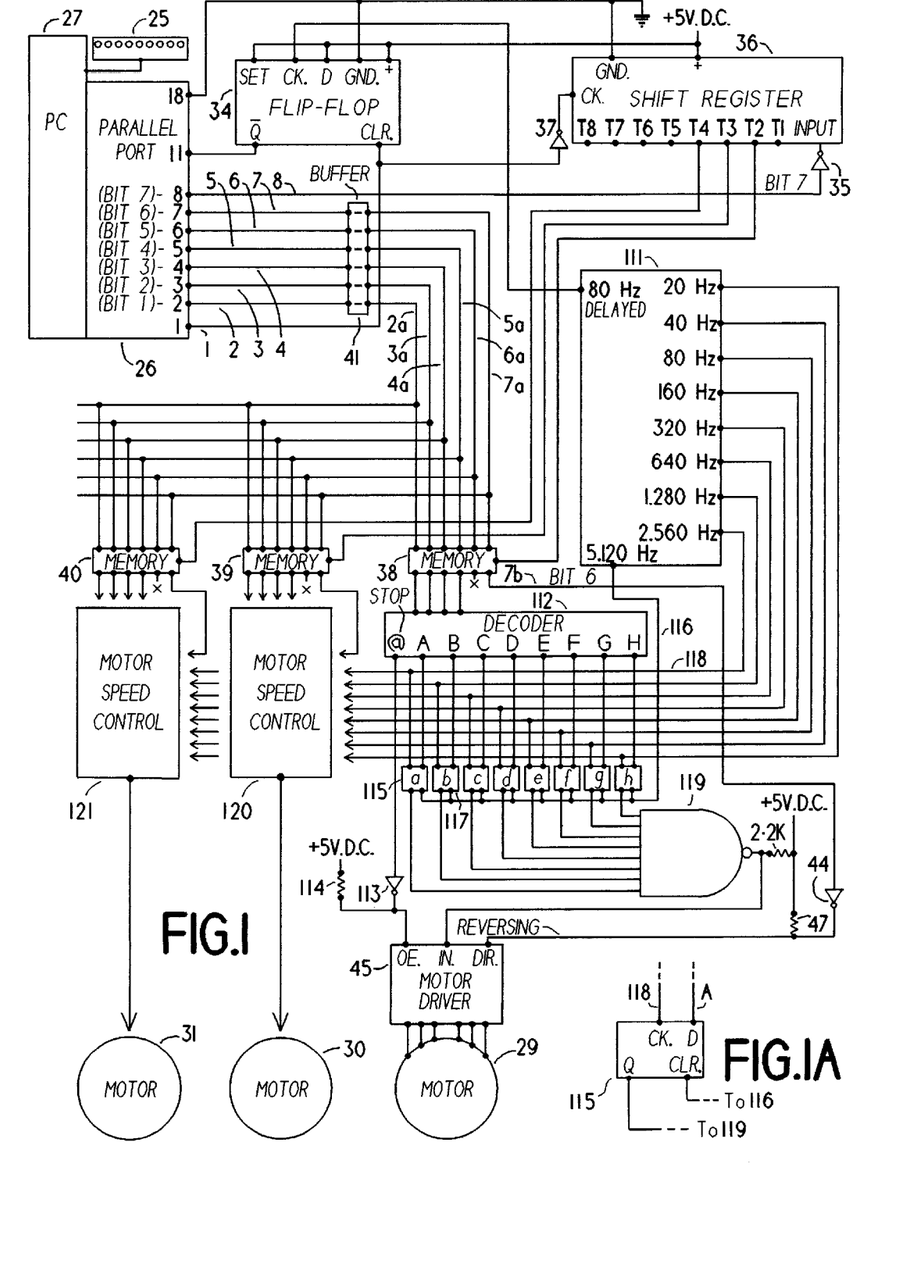
FIG. 1 is a schematic electrical circuit diagram showing the basic structure operation of the invention.
FIG. 1A shows details of a flip-flop.

In FIG. 1 of the accompanying drawings some state of the art conventions by which a PC (personal computer) controls a printer, through a Centronics parallel port are examined. Data lines 2, 3, 4, 5, 6, 7, 8 hold data, which will be sent to the printer buffers. Busy line 11 is held high whenever the printer is not ready to receive data, and goes low when it is ready. In reply to such a ready signal the parallel port circuitry pulses strobe line I low. This pulse initiates acceptance of the data into the printer buffers, and new data is then presented on data lines 2, 3, 4, 5, 6, 7, 8. After strobe line 1 pulses low, the printer control circuitry sends busy line 11 high again. Busy line 11 is held high until the data are accepted, at which time it goes low again as already described. This process is repeated continuously. Ground line 18 connects the external circuitry grounding to the PC ground. These same conventions are used in the present invention as the basis for outputting script data from the PC to control the speed and direction of stepper motors, or to control other multiple controllable devices, with the distribution circuitry shown in FIG. 1 taking the place of a printer. This printer function is shown in greater detail in my co-pending U.S. Pat. No. 5,784,541 but in the interest of brevity is not repeated here.

To prepare the script for a planned operation of the controllable devices, PC 27 should be programmed for "word processing" or any other program which allows a document containing letters of the alphabet, numbers, or any other characters to be prepared and entered line by line on screen via a keyboard or other input system, stored to disc, and then sent through parallel port 26 to a printer, or as in this invention, to the substitute distribution circuitry. Often a larger number of motors (channels of control) are used, but to simplify the following illustration, as shown in FIG. 1, only three motors, 29, 30, 31 are used, each with eight steps of speed variation, ranging from A (the fastest) to H (the slowest). As an example of the preparation of a script for operation of the motors, assume motor 29 is to run very slowly in a forward direction, motor 30 is stopped, and motor 31 is to run at about three-quarter speed in the reverse direction. With the above described eight steps of speed variation, a typical first line of the script would then be "H@c", with the upper case "H" specifying forward direction at low speed, "@" specifying "stop", and lower case "c" specifying reverse direction at three-quarter speed. The choice of upper case or lower case thus determines direction, with the earlier letters of the alphabet determining faster speeds, the later letters determining slower speeds, and the character "@" determining a stopped condition. At the end of the line of script "carriage-return" is used by using ENTER, to start a new line. If there were to be no change of speeds for a few lines, the text of the script would be repeated, thus:

H@c

H@c

H@c

Playback scan speed is typically about twenty lines (scans) per second.

Proceeding again with the preparation of the script; if motor 30 were to be started up at one-half speed in reverse direction, at this point in the script, the script would then continue as:

Hdc
Hdc
Hdc
Hdc

It can be seen that in this manner the script can specify that each of the motors separately, can be stopped, reversed, or run at any desired speed within their range. Since there are eight steps of speed variation, and since speeds can be changed twenty times per second, speed transitions can be very smooth, and in fact imperceptible. However it should be understood that a script is by nature quite voluminous, and a script for two minutes of animation is about thirty pages long, at the twenty lines per second scanning rate. Slower rates can be used if desired. After a script has been prepared and assembled using machine memory (RAM), it is stored as a "document" on either a floppy disc or the hard drive of the PC.

To replay the script to control the motors for a performance, the PC is set in the "print" mode, or if a word processing program is not used, the mode could simply be described as "output from the parallel port". The script can either be retrieved to RAM for output, or outputted directly from disc. Refer now to FIG. 1 as operation of the system is described. With the print mode engaged, and with data on data lines 2, 3, 4, 5, 6, 7, 8, pulse generator 111 sends a pulse from the 80 Hz (DELAYED) output to the clock input (CLK) of flip-flop 34 (typically a TTL 7474 IC). This sends the Q (complementary) output from flip-flop 34 low, which brings busy line 11 low, sending a "not busy" signal to the PC. In reply to this signal, the PC pulses the normally high strobe line 1 low, which causes the data on the data lines to be accepted. This action will be described later. The PC then puts new data on data lines 2, 3, 4, 5, 6, 7, 8. Also, when strobe line 1 pulses low, it causes flip-flop 34 to clear (CLR). This sends the Q (complementary) output of flip-flop 34 high again, which sends a "busy" signal to the PC via busy line 11. This "busy" condition holds until pulse generator 111 clocks flip-flop 34 again. Pulse generator 111 continues to generate pulses independently at regular intervals of typically 1/80 second, and at each pulse it clocks flip-flop 34 as already described. A sequence of negative pulses on strobe line 1 thus continues indefinitely, at a typical rate of 80 pulses per second. The response time of the PC to "not busy" signals on busy line 11 is very short compared to the 80 Hz timing cycle from pulse generator 111. The data on the data lines changes after each pulse, so that the data at each pulse represents a new letter in the script, or a command to the distribution circuitry. The above description of the circuitry shown in FIG. 1 relates to the programmed sequence wherein the data on the data lines are changed immediately after the strobe signal, not immediately before. The same circuitry can be used if the program controls a sequence with the data changing immediately before the strobe signal, which occurs with some word processing programs, as described in greater detail in U.S. Pat. No. 08/18,473.

Figure 2:
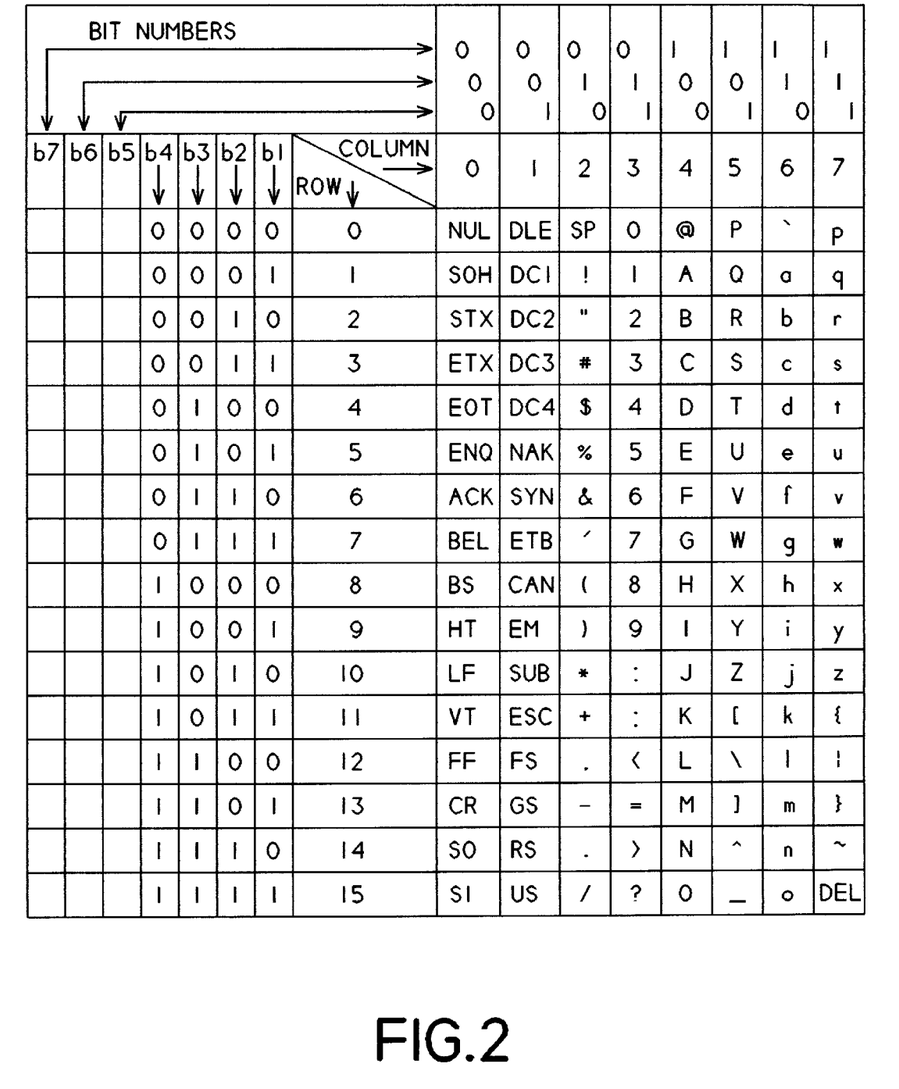
FIG. 2 is an illustration of the standard ASCII computer code.

After the last letter in a line of script has been represented on the data lines, the next data will represent the carriage-return command (CR). The carriage-return command is ignored as motor speed control data, which will be explained later, but it plays an important part in controlling the distribution of data. FIG. 2 shows the standard ASCII computer code, which is used with the system. However a PC can alternatively be programmed to operate the system with any other computer code that encodes letters, numbers and commands as data bytes carried on the data lines. Referring to FIG. 2, characters represented by ASCII codes are placed in a table designated by rows and columns. The column number of the particular character represents the most significant three bits of the ASCII code for that character (i.e., bits b7, b6, b5) while the row number represents the least significant four bits of the code (i.e., bits b4, b3, b2, b1). The seven-bit ASCII code therefore includes the three-bit column number concatenated with the four bit row number. It can be seen that the CR command is in column zero. Bit #7 (i.e., b7) represents commands in this column with a data bit value of "0". The letters of the alphabet are in columns four through seven, and bit #7 represents these letters with a data bit value of "1". This different representation by bit #7 between commands and alphabet letters is important, and is used to separate the CR commands from the letters during playback. In FIG. 1 bit #7 data are carried on data line 8, which is connected through inverter 35 to the serial input (IN) of shift register 36, (typically an eight bit, 74164, serial input, parallel output register).

Strobe line 1 is connected through inverter 37 to the clock (CLK) of shift register 36. Then, in playback operation, after the playback of a line of letters, data representing CR (carriage-return) will be present on the data lines. At that time data line 8 (bit #7) will be low, causing inverter 35 to bring the serial input of shift register 36 high. At this same time the pulse on strobe line 1 is inverted by inverter 37 to clock the register with a positive edge pulse. The data value of "1" on the input then goes to idle position T1 on the register. The next data on the data lines will represent the first letter of the next line of script. Since these data will represent a character from columns four or six (in FIG. 2), data line 8 will now be high again, and serial input of the register will be at a data value of "0". With the accompanying pulse from strobe line 1, the data "1" at position T1 with a value of "1" goes to position T2, which causes acceptance and latching of the data representing the first letter of the new line into memory 38, where the data are held. On the next pulse of strobe line 1, the data representing the second letter of the line of script are on the data lines, and when this pulse clocks register 36, the data "1" at position T2 with a value of "1" goes to position T3, which causes latching of the second letter data into memory 39, where the data are held. On the next pulse of strobe line 1, the data representing the third letter are similarly latched into memory 40. In this manner register 36 acts as a selector which switches the memories 38, 39, 40 (typically 74174 ICs) to be latched as they receive their appropriate data. The data on data lines 2, 3, 4, 5, 6, 7 first go to buffer/driver 41 (typically a 7417 IC) which provides a greater current capability to drive the multiple memory inputs. Data output from buffer/driver 41 are on data lines 2a, 3a, 4a, 5a, 6a, 7a. After the last letter of the line of script has been latched in, the next pulse moves the data "1" from position T4 with a value of "1" on to position T5 which is an idle position. At this time a new data with a value of "1" is entered into the input of the register for the next line of the script. The following pulses move the old data with a value of "1" on through idle positions T6, T7, T8, after which it is lost, and the new data with a value of "1" is moved through positions T1, T2, T3, T4 for this next line. Only the positions T1, T2, T3, T4 are used in this example, and idle positions T5, T6, T7, T8 are not connected, but they could be used if more than three motors were to be controlled. To control an even larger number of motors, registers with an appropriately large number of positions can be used, or a number of registers can be cascaded to provide an even greater number of channels. It should be noted that the only time a data value of "1" is present at the serial input of the register is while the CR command (or any other data represented in columns zero through three of FIG. 2) is present on the data lines. The data having a value of "1" is then transferred as described, to positions T1, T2, T3, T4, T5, T6, T7, T8, but no other data having a value of "1" is fed into the input of the register until the line of script has been completed and the CR command is sent again to start the next line. When preparing a script, a CR command should be written before the first line of the script. If this is not done there will be no playback of the first line; nevertheless all following lines will be played back normally.

As described, the positive edge of the output signal from position T2 of shift register 36 clocks memory 38, and the data on the input at the instant of clocking are latched in. Data from data lines 2a, 3a, 4a, 5a are then presented as data inputs to decoder 112 (typically a 7442, 1-of-10 data decoder). Decoder 112 decodes this input data to bring low the one of its ten output terminals that corresponds to the appropriate row of commands or characters (see FIG. 2) being represented by these data inputs. The other nine output terminals of decoder 112 remain high. This selected output of decoder 112 remains low (and the others remain high) until the next positive edge clocking of memory 38. At this time the data on data lines 2a, 3a, 4a, 5a are presented to decoder 112 for decoding, and for changing of the selected output, if the script requires a change at that point. The utilized output terminals of decoder 112 are marked @, A, B, C, D, E, F, G, H, in FIG. 1. Terminal @ is used for the "stop" position, and a tenth terminal is not used.

To further explain the overall operation, assume an example wherein when memory 38 is clocked, terminal C goes low. This would indicate that the data coming from the PC are representing a script entry in row three (see FIG. 2). It s obvious that the script entry must be for a letter, since a carriage-return (CR) command could not be present with the clocking signal coming from T2 of the register. Thus the script entry must have been in one of columns four through even. But columns five and seven (letters P through Z, plus some punctuation rks) are not being used in this system being shown in FIG. 1, so the script try must be in columns four or six, which specify either forward speed C, upper case) or reverse speed c, (lower case). Forward speed C is in column r, and if a letter from this column were specified in the script, bit #6 (i.e., b6) would have a data value of a"0" on data lines 7 and 7a. So when memory 38 is clocked the data bit having a value of "0" goes via line 7b to inverter 44, bringing output high, thus maintaining a high condition of the forward/reverse selector (DIR) of stepper motor driver 45 The high condition is stabilized by pull-up resistor 47, which has a typical value of 2.2K ohms. This causes driver 45 to drive motor 29 in a forward direction. If the script entry was a lower case c, (in column six) the resulting data value of "1" for bit #6 would bring the inverter 44 output low, which brings the forward/reverse selector low, causing motor rotation in the reverse direction. Forward/reverse control of the motors is controlled at all speeds by bit #6 in this manner.

When the @ output terminal of decoder 112 goes low it is calling for motor 29 to be stopped. The output of inverter 113 then goes high and brings the output enable (OE) of the motor driver high, thus stopping the motor. Pull-up resistor 114 (typically 2.2K ohms) maintains the voltage high at the OE terminal while the motor is not running.

All the other used output terminals of decoder 112 (A through H) are connected to D (data) inputs of flip-flops (typically 7474 ICs, shown in detail in FIG. 1A) which selectively apply the pulses of various frequencies from pulse generator 111 into motor driver 45 to drive the motor at various speeds. For example, when the letter A is being represented on playback, the A output terminal of decoder 112 goes low, which causes the D input of flip-flop 115 (shown in detail in FIG. 1A) to go low. Then the next positive pulse on pulse line 118 (which carries a continuous 2,560 Hz pulse train from pulse generator 111) clocks flip-flop 115, sending its Q output to go low, and bringing the output of eight-input NAND 119 high. Pulses so produced are terminated by pulses from pulse generator 111 on line 116 to the CLR terminal of flip-flop 115. In this manner, while the D input remains low, the Q output sends a continuous 2,560 Hz negative pulse train to eight-input NAND gate 119, which pulses the input IN of motor driver 45 (typically a unipolar 5804 IC) which drives a 1.8 degree/step, step motor 29. The pulse input IN is pulled high during pulsing, by a 2.2K ohm pull-up resistor. All the used output terminals of decoder 112 (A through H) are connected to flip-flops in the same manner as flip-flop 115, and all are similarly connected to inputs of eight-input NAND gate 119. The output of eight-input NAND gate 119 is connected to the input IN of motor driver 45. The CK (clock) inputs of all the flip-flops associated with terminals B through H are also connected to pulse lines from pulse generator 111, carrying continuous pulse frequencies of 1,280 Hz, 620 Hz, 320 Hz, 160 Hz, 80 Hz, 40 Hz, & 20 Hz respectively. In this manner the activation of a selected terminal of decoder 112 causes the application of the appropriate pulse frequency from the pulse generator to the motor driver. Various combinations and sizes of motor drivers and stepper motors can be used, and the ranges of pulse frequencies can be varied as needed. Decoder 112, with the shown associated eight flip-flops, and eight-input NAND 119 is combined with pulse generator 111, motor driver 45 and connected circuitry, to comprise a translator/motor speed control unit. Similar speed control units 120, 121 are used with motors 30,31, but are not shown in detail since they are essentially the same as the speed control unit of motor 29. The embodiment described above employs stepper motors, but the present invention is not restricted to that type of motor. Any other type of motor and drive system in which rotation speed is directly proportional to the controlling frequency of a fluctuating electrical current can alternatively be used. All the ICs shown in FIG. 1 are supplied with 5V.DC and with a ground common to PC 27, through ground line 18. Motor driver 45 has an independent DC motor drive power supply, typically 30V.DC.

Figures 3, 4, 4A:
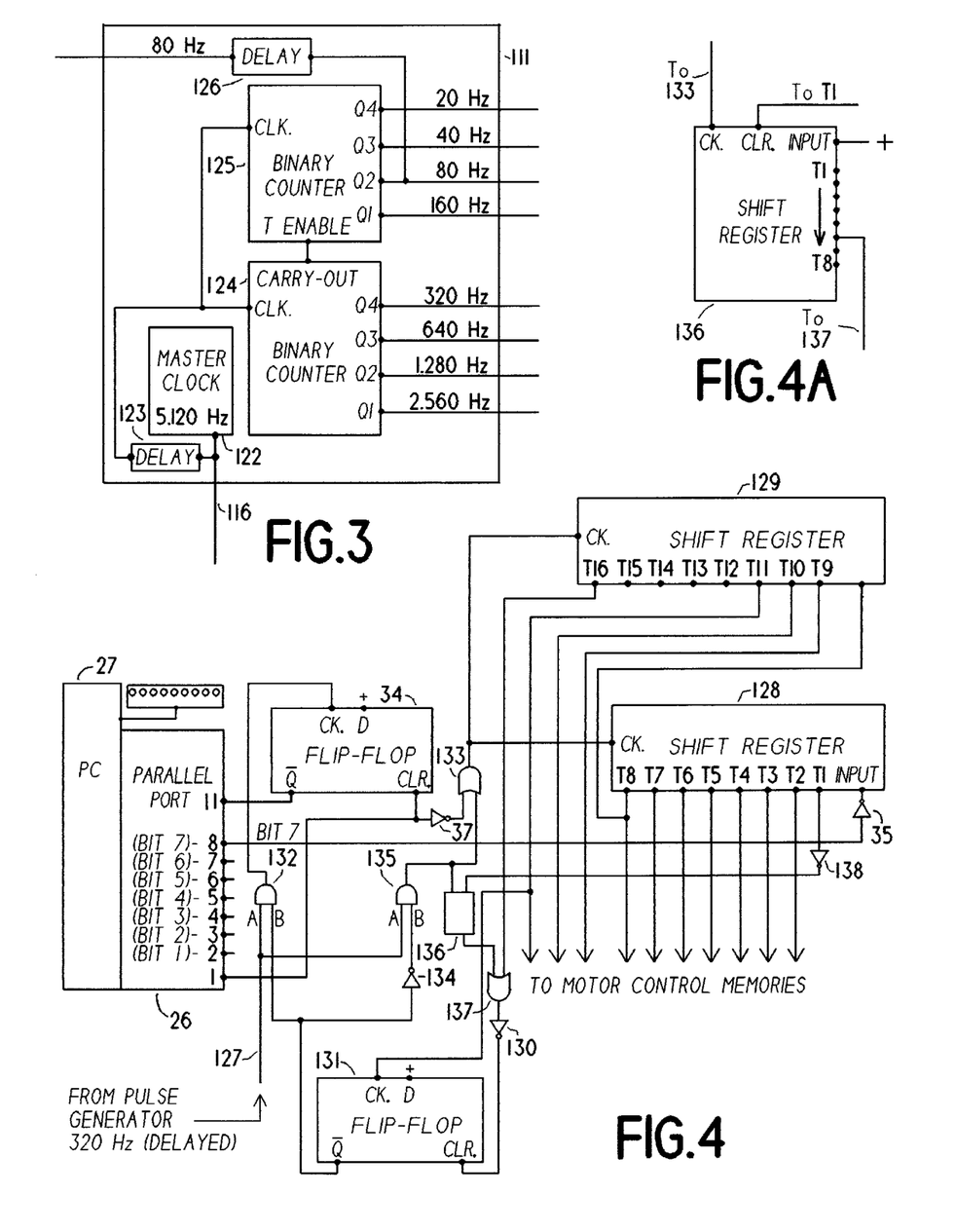
FIG. 3 shows a multiple frequency pulse generator.
FIG. 4 illustrates a circuit to compensate for various numbers of controllable devices.
FIG. 4A shows details of a shift register.

FIG. 3 shows details of pulse generator 111 as it is applied in FIG. 1 Master clock 122 is typically crystal controlled but could be any state of the art pulse source. In this embodiment a frequency of 5,120 Hz is used. This output of clock 122 is the pulse generator clocking frequency. This clocking pulse frequency is applied to the CLOCK inputs of binary counters 124, 125 (typically 74161 ICs) through delay 123. The CARRY OUT terminal of counter 124 is connected to the T (enable) terminal of counter 125. The outputs of counter 124 (Q1, Q2, Q3, Q4) and the outputs of counter 125 (Q1, Q2, Q3, Q4,) then together form an eight-bit binary weighted counter (or in this case an eight stage frequency divider), in which each frequency step is divided by two to obtain the next lower frequency. The output frequencies are 2,560 Hz, 1,280 Hz, 640 Hz, 320 Hz, 160 Hz, 80 Hz, 40 Hz, 20 Hz. Pulses at these frequencies are applied as shown in FIG. 1.

In FIG. 1 pulses are sent from the 80 Hz (DELAYED) output of pulse generator 111 to scan a new line of script every 1/20 second. It is necessary to send four pulses for every line to process the three letters in the line (and the carriage-return CR command), so there must be 80 pulses per second. In effect shift register 36 acts as a frequency divider, dividing the 80 Hz by four to arrive at the 20 Hz (1/20 second) frequency. If there were more letters in the line (more channels of control), and if it was still wanted to scan every 1/20 second, the frequency required would be increased. For example if 11 channels were being controlled, the frequency would be (11+1)×20=240 Hz.

Figure 8:
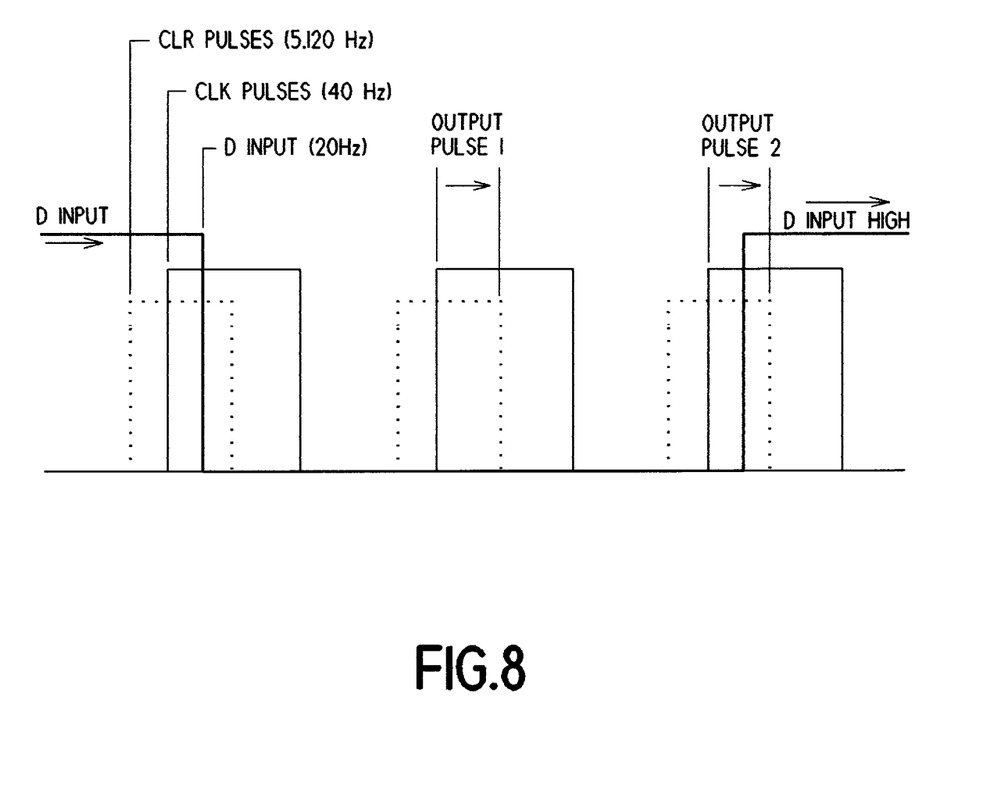
FIG. 8 Shows waveforms in the synchronized system

Since the present invention uses a system which synchronizes the scan control pulses with the motor speed control pulses, if a perfectly timed synchronization were achieved, an extra (unwanted) motor control pulse would be received at the end of the scan period. Refer to FIG. 8 and assume that during a 1/20 second scan period (with perfect synchronization) two motor control pulses were required, but that no pulses were required in the following scan period. Then at the start of the scan period there would be a coincident motor control pulse, with one more pulse occurring during the period. However at the exact end of the first scan period a third motor control pulse would occur. This would either be received as a third pulse or cause a circuit glitch. In FIG. 3, delay device 126 (typically a Data Delay Devices Inc. # DDU-5J-102000, tapped at one microsecond) is used to delay the timing of the scan pulse so that it does not coincide exactly with the motor control pulses. The one microsecond delay time is insignificant compared to the pulse width of even the fastest motor control frequency used (e.g. 2,560 Hz=390.6 microseconds delay). Delay periods other than one microsecond may be used if needed. This delay is most important at the first pulse in the scan period, since this first pulse is best blocked out completely to ensure the planned number of motor control pulses occurring within each scan period. FIG. 8 shows how the first pulse is blocked out. In the 1/20 second scan period (as seen at the D input of the flip-flops) there are three pulses (from pulse generator 111 ) involved. Because the scan timing is delayed by delay device 126, there will be a high condition on the D input of the flip-flop when the 40 Hz CLK pulse clocks the flip-flop. Thus the Q output of the flip-flop remains high and there will be no pulse output to the motor controller. It should be noted that the pulses outputted from the Q output are negative pulses as described earlier. When the D input voltage does drop, it is too late, since clocking has already occurred, and there will be no pulse output to the motor controller for the whole of the first CLK pulse. On the second pulse the D terminal will be low at the clocking and the first output pulse will go to the motor controller. Similarly on the third pulse a second output pulse will go to the motor controller, since the scan control voltage is low at the clocking. Thus the required two complete output pulses are initiated. However it is also necessary to terminate each output pulse, so CLR pulsing is provided to the flip-flops on line 116 (FIG. 1A). This pulsing frequency is timed in advance of the CLK pulses, so that the CLR input of the flip-flop is already high when the clocking pulse arrives. This is achieved by sending the CLR pulsing directly from the master clock, and delaying the timing of all the other pulse frequencies in pulse generator 111 with delay device 123 (FIG. 3). This allows a proper clocking to occur with the CLR input high, and then at the completion of the clearing pulse the CLR input goes low thus bringing the Q output high to terminate the output. Delay device 123 is typically of the same type as delay device 126, and a typical tapping of 1 microsecond can be used. The frequency of the CLR pulsing (5,120 Hz) is many times greater than the CLK (40 Hz) pulse frequency but this is not a problem because with the synchronization involved, there is always a rising edge of a CLR pulse 1 microsecond in advance of the rising edge of each CLK pulse, regardless of how many CLR pulses occur between CLK pulses. The pulse width of the CLR pulses (approximately 100 microseconds) is still ample for providing a reliable output pulse. The waveforms in FIG. 8 are not in proportion to the time-spans involved because of their wide differences. The delay devices described are a simple reliable means of providing the required delays. Alternatively other delay methods can be used, such as the more complex state of the art delay systems, which are synchronized and gated at very high master clock frequencies. The pulse frequencies used can be different from those shown, but the scan frequency should always be exactly divisible into all of the motor speed control frequencies. For example, a 1/30 second (30 Hz scan frequency) could be used, but then the motor control frequencies would need to be 30 Hz, 60 Hz, 120 Hz, 240 Hz, 480 Hz, 960 Hz, 1,920 Hz, 3,840 Hz to provide synchronization.

A large number of motors or other controllable devices can be used. Actually the maximum depends on the number of characters in a line of text in the program being used. However some modifications may need to be made to shift register 36 depending on the number of motors or devices in use. With this synchronized system it is necessary that the number of steps in use in shift register 36 (including one step for the CR command) must be equal in number to the dividend obtained by dividing the one of the pulse generator frequencies used to control scanning (80 Hz in FIG. 1) by the scan frequency (20 Hz in FIG. 1). Since there are only eight pulse generator frequencies in use, there are only eight different numbers of shift register steps available. With a 20 Hz scan frequency, the numbers of steps that can be used are:

20 Hz/20 Hz=1 step,
40 Hz/20 Hz=2 steps,
80 Hz/20 Hz=4 steps *(as in FIG.1),
160 Hz/20 Hz=8 steps,
320 Hz/20 Hz=16 steps,
640 Hz/20 Hz=32 steps,
1,280 Hz/20 Hz=64 steps,
2,560 Hz/20 Hz=128 steps As shown above in the embodiment of FIG. 1, four steps of shift register 36 are used (three motors plus one CR command). But if a larger number of motors (or other controllable devices) were to be controlled, a larger number of steps would need to be used. As an example, if ten motors were to be controlled, eight steps would not be enough, so the next highest number of steps (sixteen) would need to be used. With this arrangement the pulse generator frequency of 320 Hz would be sent through delay device 126 to pulse line 127 to clock flip-flop 34. As shown in FIG. 4, shift registers 128,129 (typically 74164 ICs) are cascaded to provide sixteen shift steps (T1 through T16) by connecting step T8 output of shift register 128 to the serial input of shift register 129. The first step is used to register the CR (carriage-return) command, the next ten control the latching into memory of data for the ten motors, and the last five are idle positions which balance out the remainder of the sixteen steps necessary for synchronized operation. Description of the operation of the embodiment of FIG. 4 starts with a data bit value of "1" on position T16 of register 129, and the data representing CR (carriage-return) ready to be accepted on the next pulse of strobe line 1. The high state at position T16 brings the output of inverter 130 low, which condition is applied to the CLR (clear) terminal of flip-flop 131 (typically a 7474 IC), causing its Q (complementary) terminal to go high. This brings the "B" input of AND gate 132 high. Then, the FIRST IN A DESCRIBED SERIES OF POSITIVE EDGE PULSES on pulse line 127 is applied to the "A" input of AND gate 132, which outputs a positive edge pulse to the CK (clock) terminal of flip-flop 34. A continuous succession of pulses are then sent in this manner from pulse line 127 to clock flip-flop 34, similarly as shown in FIG. 1, except that the pulse frequency is now higher (320 Hz) because of the larger number of steps in use with the shift registers. Also, as described with FIG. 1, clocking of flip-flop 34 causes a chain of events resulting in the changing of data on data lines 2 through 7, and the pulsing of strobe line 1 to accept the new data after each clocking. These same events occur in the embodiment of FIG. 4- To continue on from the above "first in a described series of positive edge pulses", this first pulse clocks flip-flop 34 causing strobe line 1 to pulse low. Inverter 37 then pulses high through OR gate 133 to clock shift registers 128,129 through their CLK terminals. At this same time of pulsing, since the data representing a carriage-return (CR) is on the data lines, data line 8 will be low, causing inverter 35 to bring the serial input of shift register high. So when this first pulse causes clocking of shift register 128 the data value of "1" on its serial input shifts to the CR register position (T1). The next data on the data lines will represent the first letter of the next line of script- Since this data will represent a character from columns four or six (in FIG. 2), data line 8 will now be high again, and serial input of the register will be at a data value of "0". With the next clocking of register 128, the data value of "1" at position T1 shifts to position T2, which causes acceptance and latching of the data representing the first letter of the new line into the memory of the first motor, where it is held. On the next clocking of shift register 128, the data representing the second letter of the line of script are on the data lines, and at this clocking, the data value of "1" at position T2 shifts to position T3, which causes latching of the second letter data into the memory of the second motor, where it is held. On the next clocking of shift register 128 the data representing the third letter is similarly latched into the memory of the third motor. In this same manner the data value of "1" shifts through the positions of registers 128, 129, sending clocking signals to each motor control memory in turn, until it reaches position T1 when it causes the latching of the data representing the tenth letter into the memory of the tenth motor. This latching of data into the memories of the motors is the same as latching in the embodiment of FIG. 1 up to this point, however a different procedure continues when the data value of "1" shifts into position T1. When the T1 terminal goes high it causes clocking of flip flop 131 (with its D input held high) thus sending its Q (complementary) output low. This low condition is applied to the "B" input of AND gate 132 preventing further clocking of flip-flop 34, and to inverter 134 which sends the "B" input of AND gate 135 high. This allows pulses from pulse line 127 to cause output from AND gate 135, and OR gate 133 to clock shift registers 128,129 directly. This then causes the data value of "1" to shift through idle positions T12, T13, T14, T15, T16. After terminal T11 goes high, data representing carriage-return (CR) is ready to be accepted on the next clocking of strobe line 1, and these CR data remain ready while shifting through the idle positions, because there is no clocking of flip-flop 34 during this period. When the data value of "1" reaches position T16, flip-flop 131 is cleared again and the shifting sequence involving the "described series of positive edge pulses" is completed, recommended, and repeated continuously. It should be noted that the only time a data value of "1" is present at the serial input of register 128, is while the CR command (or any other data represented in columns zero through three of FIG. 2) is present on the data lines. The data value of "1" is then transferred as described, to positions T1 through T16, but no other data value of "1" is fed into the serial input of the registers until the full required series of shifts has been completed and the CR command is again clocked in to start the next series.

When the system is starting up it is uncertain what state flip-flop 131 will be in; whether the Q (complementary) output will be high or low. Should it be low, this would prevent pulses from clocking flip-flop 34 and thus no CR signal would come from the PC to start the distribution sequence. The shift registers would simply be clocked continuously in the idle sequence. To prevent this, shift register 136 (shown in detail in FIG. 4A, typically a 74164 IC) is clocked by the idle sequence pulses, so that if there is a greater number of pulses than those required in the idle sequence, it will clear flip flop 131 through OR gate 137 and inverter 130. FIG. 4A shows eight output positions (T1 through T8) on shift register 136, and a connection for clearing flip-flop 131 is shown on the T6 position. This allows one additional pulse over the required number of idle pulses before it clears the flip-flop. Shift register 136 is then cleared when data at the T1 position of shift register 128 grounds the CLR terminal through inverter 138. To control an even larger number of motors, registers with an appropriately large number of step positions can be used, or a number of registers can be cascaded to provide any suitable number of step positions. If the number of motors (or other controllable devices) in use were 1, 3, 7, 15, 31, 63,127, no idle positions on the registers would be needed, but for any other number of motors or devices, the next highest number of compatible step positions must be used, with idle positions used to balance the difference.

Figure 5:
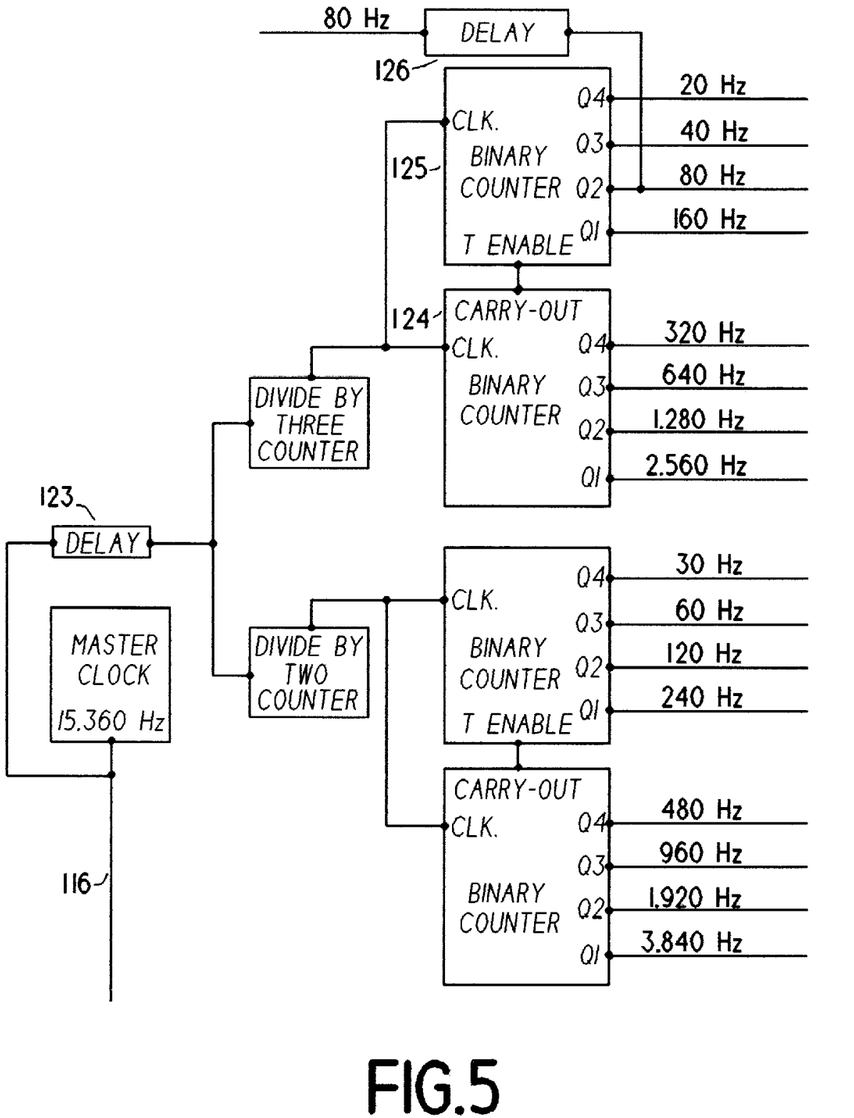
FIG. 5 shows an alternate pulse frequency generator with a larger number of available frequencies.

FIG. 5 shows an alternative pulse generator which uses a 15,360 Hz master clock, the output frequency of which is divided by a "divide by three" counter to obtain the same clocking frequency of 5,120 Hz which was applied to binary counters 124, 125 in FIG. 3. This same clocking frequency is similarly inputted to binary counters 124, 125 in FIG. 5, resulting in the same range of output frequencies. However, in addition the 15,360 Hz master clock output is divided by a "divide by two" counter, providing a 7,680 Hz input to two additional cascaded binary counters, which provide a range of output frequencies intermingled between the output frequencies of binary counters 124, 125. These frequencies are 3,840 Hz, 1,920 Hz, 960 Hz, 480 Hz, 240 Hz, 120 Hz, 60 Hz. Many different combinations of master clock frequencies and dividers can be used in the present invention; and the combinations shown are to be taken only as examples.

Figure 6:
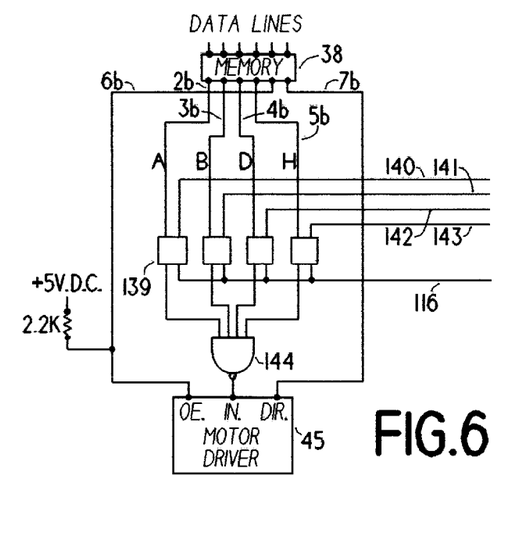
FIG. 6 illustrates a simpler circuit for a small number of speed variations.
Figure 6A:
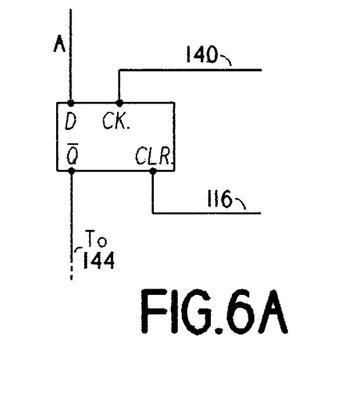
FIG. 6A -shows details of a flip-flop.

Some movements of an animated figure are simpler than others and do not require as many steps of speed variation; so that the control circuitry for that motor is less complex. For example the motor used to move an eyelid to blink may do quite well with only three speed variations, while the motor moving a replica of a human arm may need fifteen steps of speed variation to appear lifelike. If needed, a maximum of twenty-six steps could be used. The eye-blink motor can usually be a simple small motor, while the motor for the arm may need a full range of speed variation, and be a much larger, more sophisticated motor. If only a smaller number of speed variations are needed for a given motor, a simplified decoder as shown in FIG. 6, can be used. In this arrangement, decoder 112, as shown in FIG. 1, is not needed, and data lines 2b, 3b, 4b, 5b coming from memory 38 are each connected directly to the D inputs of four flip-flops, identical to flip-flop 139. (detailed in FIG. 6A). The CLK (clock) input of each of these flip-flops is connected to one of the pulse lines 140,141,142, 143. Each of these pulse lines carries positive edge pulses at a different frequency, from pulse generator 111. Typical frequencies on pulse lines 140,141, 142,143 might be 1,280 Hz, 320 Hz, 80 Hz, 20 Hz respectively. The CLR (clear) inputs of the flip-flops are connected to clear line 116 in the same manner as shown in FIG. 1. Each of the Q (complementary) outputs from the flip-flops is connected to one of the inputs of four-input NAND gate 144, the output of which is connected to the pulse input of motor driver 45. This simplified method is made possible by the choice of the specific letters in script preparation, to specify the required speeds. Referring to FIG. 2, the choice of "A", which is in row one, causes bit #1 (i.e. b1) to go high, with bits #2, #3, #4 (i.e.,2, 3 , 4) low. Since bit #1 is carried on data line 2b, this will send the D input of flip-flop 139 high. Then as pulse line 140 sends positive edge pulses to its CK (clock) input, it outputs a similar frequency (but negative) pulse stream to one of the inputs of four-input NAND gate 144. This gate then delivers a positive edge pulse stream to motor driver 45 causing its associated motor to run at a speed relative to the pulse frequency on pulse line 140. Choosing "B", which is in row two, causes bit #2, and thus the D input of the second flip-flop to be sent high, which combined with the 320 Hz pulse flow from pulse line 141 causes the motor to run at a relatively lower speed, in the same manner as with speed "A". Choices of "D", or "H" send respective bits #3, or #4 high, thus causing the engagement of pulse frequencies of 80 Hz or 20 Hz, whereby still slower speeds are attained. When the motor is to be stopped "@" is selected, and this causes (as shown in FIG. 2) all bits to be low. Thus data lines 2b, 3b, 4b, 5b are all low (FIG. 6), and then the D inputs of all the flip-flops are low. This prevents any pulse flow to the motor driver, thus stopping the motor, but in an energized condition. This condition holds the motor firmly in the position of its last step, and is useful in some instances, although there is a current flow through motor winding while held in this manner. If it is required to de-activate the motor the letter "P" can be written in the script. Referring to FIG. 2, "P" still causes bits #1, #2, #3, #4 to be low, which prevents any pulses reaching the motor driver, but in addition, since it is in column five it sends bit #5 (line 6b in FIG. 6) high. Line 6b is connected to the output enable (OE) of motor driver 45, and a high state of the OE causes the motor to be stopped and de-activated. A 2.2K ohms pull-up resistor stabilizes the high condition of the OE. Control of memory latching and motor direction is the same with this arrangement shown in FIG. 6, as the previously described arrangement of FIG. 1. Memory 38 similarly holds the data from the data lines. Also, bit #6, carried on line 7b similarly controls motor direction.

Figure 7:
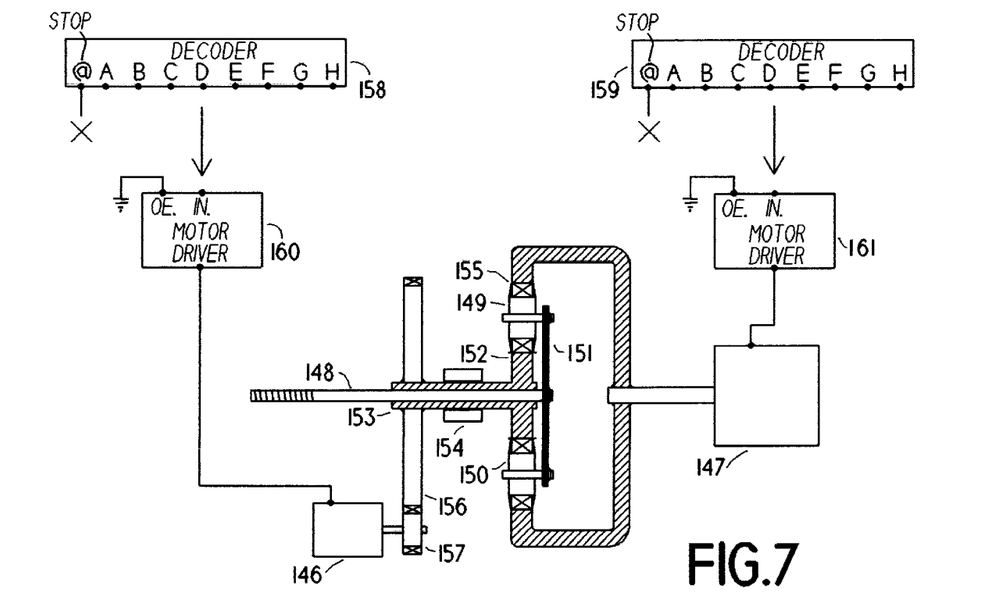
FIG. 7 shows an arrangement for using two motors with different gear reductions control one axis of movement using a differential gear system.

In CNC applications it is sometimes necessary, in one axis of movement, to have a choice of a very rapid movement, or alternately, a slow high resolution movement. A typical example is when a cutting tool must be advanced at a very slow and smooth feed rate for a considerable distance, and then returned rapidly to the starting point. This application presents a problem with a stepper motor drives, because motors finely geared for slow feed rates are not capable of high-speed movement. An embodiment of the present invention is shown in FIG. 7, in which two motors 146, and 147 (which is a more powerful motor) are both used separately to propel an output shaft 148 (typically a machine tool lead screw). A differential gear system is used to allow either of the motors to propel the output shaft separately. The axle shafts for planet gears 149, 150 are mounted on planet gear carrier 151, which is attached to output shaft 148. Sun gear 152 is attached to drive shaft 153, which is supported by bearing 154. Internal gear 155 is connected by a housing to the drive shaft of the rapid positioning motor 147, and engages planet gears 149, 150, as does sun gear 152. Reduction gear 156 is also attached to sun gear shaft 153 and is driven by pinion 157 attached to the drive shaft of slow feed motor 146. Decoders 158, 159 control motor drivers 160, 161 to drive motors 146, 147 in a similar manner to the operation of decoder 112 controlling motor driver 45 to drive motor 29 in FIG. 1, except that the "@" terminals of decoders 158, 159 are left unconnected, and the output enable (OE) terminals of motor drivers 160, 161 are directly grounded. In a typical machining operation the script (or machining operation file) might call for a slow feed rate to achieve a high finish result in a lathe turning operation. To achieve this the script would call for rapid positioning motor 147 to be stopped during the feed, by writing a "@" for the period of the feed. In the manner shown in FIG. 1 this selects the "@" terminal of decoder 159 preventing any pulses reaching motor 147. But since the output enable (OE) of motor driver 161 is grounded, motor 147 remains energized and held in a locked position, thus locking internal gear 155 from movement. At this same time the script calls for movement of slow feed motor 146, so decoder 158 controls motor driver 160 to run at an appropriate speed in the required direction in the manner described with FIG. 1. Pinion 157 on the motor shaft engages with the much larger reduction gear 156 on drive shaft 153, providing a substantial speed reduction and increase in resolution. Multi-stage gearing or worm drives can be used for even greater reduction. Rotation of drive shaft 153 drives sun gear 152 which engages with planet gears 149, 150, but since internal gear 155 is locked, the planet gears are driven to orbit around sun gear 152. This orbiting motion forces rotation of planet gear carrier 151 and output shaft 148 to which it is attached. Output shaft 148 typically is attached to a machine slide lead screw, and its rotation causes feed movement of a cutting tool. At the end of the feed movement, the script would typically call for a rapid positioning return of the cutting tool. The script then includes a "@" to control decoder 158 to stop movement of feed motor 146 and leave it in the locked condition. At this same time the script calls for activation of motor 147 (through decoder 159 and motor driver 161) in the required direction to return the cutting tool. Motor 147 turns internal gear 155, and since sun gear 152 is now held, planet gears 149, 150 are propelled to rotate and drive planet gear carrier 151, and the attached output shaft 148. Since the more powerful motor 147 does not have the reduction gearing of motor 146 it can move the drive shaft 148 at the required more rapid positioning speed. Operational selection of the rates and resolution of movements of the output shaft is a matter of selection of one, or other, of the two motors, combined with selection of the actual motor rotation speeds and directions, which are variable in the manner described with FIG. 1 and FIG. 6.

As mentioned above, the present invention can be operated with an existing word processing program, or with a simplified program which performs similar basic functions such as: Writing and editing a script document as already described, saving that document to disc, retrieving the data of the document and outputting it through the parallel port of the PC. If an existing word processing program is used, the line format must be set so there is no left-hand margin. This is necessary because left-hand margins would cause a number of space (SP) commands between the CR command and the first letter of the following line. This would interfere with the sequence of operation. Similarly since most scripts will have a number of pages, the page format must be set so there is no top or bottom margins. This allows the script to proceed uninterrupted from the last line of one page to the first line of the next page. Top or bottom page margins would cause a number of extra line-feed (LF) commands to interrupt the sequence.

The present invention can be used with a QBASIC (or other) programs, and statements written in these programs allow LPRINT data to be outputted from the PC parallel port, for controlling the controlled devices. If a script is to be continuously repeated, "looping" can be used. Alternatively the present invention can be operated using an output of data from the serial port of the PC. This serial data can be converted to parallel data by circuitry, and applied as parallel input to the system. Serial/parallel converters are readily available and can be considered state of the art. However no advantage can be seen in using the serial port, since it would be necessary to convert parallel data to serial data at the serial port with a UART chip, and then convert it back again to parallel data, with no real advantage gained. The stored data referred to as a "script" may seem to be better described as a program (of motor functions). But the use of this term is avoided to prevent confusion with actual computer programs, such as word processing programs and math programs.

When using the present invention in a CNC application, perfect repeatability can be expected, provided the driven stepper motors are of adequate size and quality, and they are operated within their reliable speed ranges. With a synchronized pulse source, the number of pulses is exactly the same during each scan of a specific scripted character, thus placing the motor (and the mechanical components actuated by it) in the exact planned position. Of course position sensors are necessary to establish machine zero positions at the start of a movement. However the motors need to operate at various speeds, to accommodate feed rates, fast tool return speeds, ramp-up, deceleration etc. Therefore, it is not a simple matter to translate the required machine positions into the exact combination of script characters and to write them into a number of lines of script. Actually, this can be done with some time being spent in calculations, but it is more convenient to use a computer math program which runs concurrently with the word processing program in use, and which will make the calculations automatically. This is similar in use to the existing CNC systems wherein the operator enters positions, G-codes etc., and the math program translates this data into the appropriate machine instructions. Such programming is not within the scope of the present invention but if used, there should be an overall advantage over the existing CNC systems considering the present inventions larger numbers of coordinated axes, and the ability to use open loop, stepper motor systems.

When preparing scripts for mechanical animation of figures, direct keyboard entry of each character can be accomplished. However if a script controlling any significant time of performance is prepared, the sheer volume of this work is tedious. This is apparent when considering that each page (typically 80 lines) of script will run the system for only four seconds of time. If there are ten motors (axes) being controlled simultaneously, it will be necessary to address 800 characters for every four seconds of script. This can be alleviated somewhat by the use of a selection of macros to repeat the often used movements.

Also, a joy-stick can be employed to control a motor directly for a specific period of time. The script for that motor can be entered into a secondary PC while the direct control is in progress, and then the data of that script transferred to the main PC. Later, this first motor can be controlled by the main PC while an additional motor is directly controlled and its script similarly entered into the secondary PC, coordinating the movements of the second motor with the first motor. Later still, any number of additional motor scripts can be added in this manner, coordinating the data of additional motors, one at a time with the data of those previously entered.

What is claimed is:

1. The apparatus for controlling a plurality of electric motor speed controllers wherein each of said electric motor speed controllers includes a plurality of different control settings with each of said control settings corresponding to a character of a predetermined set of characters, said apparatus comprising:

a file for storing a plurality of said characters to control each of said electric motor speed controllers pursuant to a predetermined script;

personal computer means for processing said file, said personal computer means including:

input means for entering said plurality of characters into said file;

manipulation means for creating and editing said file to arrange the entered characters in a predetermined sequence;

editing means for arranging said entered characters into lines of script wherein each line comprises a plurality of said entered characters equal in number to the number of said electric motor speed controllers, wherein each of said entered characters in said line relates to a different electric motor speed controller, and wherein the identity of each of the said entered characters corresponds to one of the said control settings, such that the characters relating to each electric motor speed controller are in the same order in all said lines of script;

additional input means included in said editing means for inserting a carriage return code at the end of each of said lines of script and thereby establish said lines of script;

memory means for storing said file;

encoding means for encoding said entered characters and carriage return codes stored in said file for transmission, wherein said entered characters are upper and lower case letters and said encoding means further includes means for encoding said entered characters using a computer code;

output port means operative in response to a plurality of command signals for transmitting separately each of said encoded entered characters and carriage return codes in the sequence of said predetermined script whereby each of said plurality of command signals causes a single one of said encoded entered characters or one carriage return code to be transmitted;

pulse source means for issuing said plurality of command signals at predetermined evenly spaced time intervals; and interface means for decoding said encoded entered characters received from said output port means and controlling each of said electric motor speed controllers in accordance with the control settings corresponding to said decoded entered characters, said interface means including:

a plurality of memories wherein each said memory is associated with one of said electric motor speed controllers for storing said entered characters from said file corresponding to said control settings of said one of said electric motor speed controllers;

a shift register for enabling said entered characters from said file transmitted from said output port means to be latched sequentially into each of said memories in sequences corresponding to said lines of script;

data detection means for detecting the said carriage return code at the end of each of said lines of script thereby controlling said shift register to begin a new sequence corresponding to each new line of script; and a plurality of distribution means, wherein each said distribution means is associated with one said electric motor speed controller and one associated memory for decoding said entered characters latched in each said associated memory, each said distribution means including a plurality of terminals with each of said terminals being associated with a respective one of the control settings for the associated electric motor speed controller such that at any time only the terminal associated with the control setting corresponding to the said entered character latched in said associated memory at that time is held at a first predetermined voltage while others of said terminals are held at a second predetermined voltage, and each said distribution means further includes:

pulse generator means of generating pulses at a plurality of inter-related frequencies on a plurality of pulse output lines;

switching means of selectively connecting each of said pulse output lines to the said associated electric motor speed controller input in accordance with the said first predetermined voltage at each of said terminals, such that each of the said terminals is associated with a corresponding one of the said pulse output lines, thereby causing the said associated electric motor speed controller to be controlled by pulse frequencies corresponding to the voltages at each of the said plurality of terminals;

electrical connection means of connecting said associated electric motor speed controller to a stepper motor and thereby controlling said stepper motor to run at a speed controlled by said associated electric motor speed controller in accordance with said control settings corresponding to decoded said entered characters;

data decoding means of determining the case of each of said upper and lower case letters;

direction control means for sending a control signal from said data decoding means to direction control means within said electric motor speed controller thereby controlling the direction of rotation of said associated motor such that upper case letters cause a predetermined direction of rotation and lower case letters cause the reverse direction of rotation; and synchronization means of connecting one of the said pulse output lines to said pulse source means and thereby relating the timing of the said pulse source means to the said pulse frequencies corresponding to the voltages on the said terminals.

* * * * *